United States Patent
Shon et al.

(10) Patent No.: US 8,200,970 B2
(45) Date of Patent: Jun. 12, 2012

(54) METHOD AND APPARATUS FOR PREVENTING REPLAY ATTACK IN WIRELESS NETWORK ENVIRONMENT

(75) Inventors: Tae-Shik Shon, Suwon-si (KR); Hyo-Hyun Choi, Seoul (KR); Bon-Hyun Koo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 505 days.

(21) Appl. No.: 12/433,224

(22) Filed: Apr. 30, 2009

(65) Prior Publication Data
US 2009/0300354 A1  Dec. 3, 2009

(30) Foreign Application Priority Data
May 30, 2008 (KR) .................. 10-2008-0051117

(51) Int. Cl.
*H04L 29/06* (2006.01)
(52) U.S. Cl. ...................... 713/168; 713/169
(58) Field of Classification Search .................. 713/168, 713/169, 178, 179, 181
See application file for complete search history.

(56) References Cited

U.S. PATENT DOCUMENTS

| | | | | |
|---|---|---|---|---|
| 6,151,395 A | * | 11/2000 | Harkins | 380/286 |
| 6,253,326 B1 | * | 6/2001 | Lincke et al. | 726/12 |
| 6,633,980 B1 | | 10/2003 | Johnson | |
| 7,415,110 B1 | * | 8/2008 | Lee | 380/44 |
| 2005/0055573 A1 | * | 3/2005 | Smith | 713/201 |
| 2006/0271708 A1 | * | 11/2006 | Bolles et al. | 709/246 |
| 2007/0083766 A1 | * | 4/2007 | Farnham et al. | 713/176 |
| 2007/0237145 A1 | * | 10/2007 | Adhikari et al. | 370/392 |
| 2008/0263647 A1 | * | 10/2008 | Barnett et al. | 726/6 |
| 2010/0250476 A1 | * | 9/2010 | Khoury et al. | 706/13 |

OTHER PUBLICATIONS

Galois Field—2003 Peter J Cameron.*
Part 15.4: Wireless Medium Access Control (MAC) and Physical Layer (PHY) Specifications for Low-Rate Wireless Personal Area Networks (WPANs), IEEE Std 802.15.4, Sep. 8, 2006.

* cited by examiner

*Primary Examiner* — Jung Kim
*Assistant Examiner* — Tri Tran
(74) *Attorney, Agent, or Firm* — The Farrell Law Firm, P.C.

(57) ABSTRACT

A method for preventing a replay attack is provided. A prime number is mutually exchanged between a main node and children nodes. The main node generates a Prime Sequence Code Matrix (PSCM) corresponding to the prime number, notifies the children nodes of sequence orders corresponding to the children nodes. The main node selects an arbitrary value of a Prime Sequence Code-1 (PSC1) among a series of values corresponding to an arbitrary node in the PSCM. The arbitrary node computes a Prime Sequence Code-2 (PSC2) subsequent to receiving the PSC1 using a sequence order received from the main node and the prime number. The PSC2 is transmitted to the main node. The main node compares the received PSC2 with the PSCM. The method can be easily applied by supplementing a weakness for a replay attack on the basis of an IEEE 802.15-4-2006 standard and minimizing system load.

12 Claims, 6 Drawing Sheets

FIG.2

REPLAY ATTACK PROTECTION TABLE

| Seq Order | Node | | | | PSCM(p=7, Max Node=6) | | | | |
|---|---|---|---|---|---|---|---|---|---|
| 1 | B  | 0 | 1 | 2 | 3 | 4 | 5 | 6 |
| 2 | D  | 0 | 2 | 4 | 6 | 1 | 3 | 5 |
| 3 | A  | 0 | 3 | 6 | 2 | 5 | 1 | 4 |
| 4 | C  | 0 | 4 | 1 | 5 | 2 | 6 | 3 |
| 5 | CH | 0 | 5 | 3 | 1 | 6 | 4 | 2 |
| 6 | E  | 0 | 6 | 5 | 4 | 3 | 2 | 1 |

FIG.5A

| Octets: 2 | 1 | 0/2 | 0/2/8 | 0/2 | 0/2/8 | 0/5/6/10/14 | variable | 2 |
|---|---|---|---|---|---|---|---|---|
| Frame Control | Sequence Number | Destination PAN Identifier | Destination Address | Source PAN Identifier | Source Address | Auxiliary Security Header | Frame Payload | FCS |
| MHR | | Addressing fields | | | | | MAC Payload | MFR |

FIG.5B

| Bits: 0-2 | 3 | 4 | 5 | 6 | 7-9 | 10-11 | 12-13 | 14-15 |
|---|---|---|---|---|---|---|---|---|
| Frame Type | Security Enabled | Frame Pending | Ack. Request | PAN ID Compression | Reserved | Dest Addressing Mode | Frame Version | Source Addressing Mode |

METHOD AND APPARATUS FOR PREVENTING REPLAY ATTACK IN WIRELESS NETWORK ENVIRONMENT

PRIORITY

This application claims priority under 35 U.S.C. §119 to an application entitled "METHOD AND APPARATUS FOR PREVENTING REPLAY ATTACK IN WIRELESS NETWORK ENVIRONMENT" filed in the Korean Intellectual Property Office on May 30, 2008 and assigned Serial No. 10-2008-0051117, the contents of which are incorporated herein by reference.

BACKGROUND OF THE INVENTION

1. Field of the Invention

The present invention relates generally to wireless network security technology, and more particularly, to defense against a replay attack using a Prime Sequence Code Matrix (PSCM) without changing a Media Access Control (MAC) protocol in wireless network environment.

2. Description of the Related Art

In wireless network communication, it is always possible for an unauthorized third party to intrude into, or overhear, communication, destruct a communication message, or steal desired materials. In particular, a malicious intruder may find a message transmission through an arbitrary means even when a client encrypts an operation message and transmits the encrypted message to a server computer in a communication process through an arbitrary communication medium between the client and the server. Since the malicious intruder is not actually interested in message content, the message encryption is not important to him/her. However, when the malicious intruder steals or archives the message and then transmits the message to the server, the server may misidentify that the message is transmitted from the client managed by the server. If so, the malicious intruder may badly influence the server and communication by freely intruding into the server and deleting or distributing information. This is conventionally called a replay attack.

Various technologies for preventing the replay attack are being developed. For example, U.S. Pat. No. 6,633,980 discloses a method using a secret algorithm exchanged between a client and a server. The secret algorithm changes a message or a digest attached to the message by periodically modifying a predetermined replay key according to time. Even when an operation message stolen by a malicious intruder is replayed in the server, the server may defend against a replay attack by determining whether the message is received from an authenticated client since the stolen message does not match a replay key recognized by the server.

In another method a frame counter is presented. However, this method is not suitable for a standard since forgery is possible. To address this problem, a time stamp is added and used. However, since this method requires an additional header field of at least 4 bytes, there is a problem in that system load may increase and application may be possible in only a beacon message.

SUMMARY OF THE INVENTION

The present invention has been made to address at least the above problems and/or disadvantages and to provide the advantages described below. Accordingly, an aspect of the present invention provides a new method for defending against a replay attack using a PSCM without changing an existing MAC protocol in a wireless communication environment.

According to one aspect of the present invention, a method is provided for preventing a replay attack. A prime number is mutually exchanged between a main node and children nodes. The main node generates a PSCM corresponding to the prime number. The main node notifies the children nodes of sequence orders corresponding to the children nodes. The main node selects an arbitrary value of Prime Sequence Code-1 (PSC1) among a series of values corresponding to an arbitrary node in the PSCM. The arbitrary node computes Prime Sequence Code-2 (PSC2) subsequent to received PSC1 using a sequence order received from the main node and the prime number and transmits PSC2 to the main node. The main node compares received PSC2 with the PSCM.

The main node and the children nodes may mutually exchange an algorithm for automatically computing PSC1 and PSC2 before the PSCM is generated.

The prime number may be mutually exchanged in a process in which the children nodes join the main node.

The PSCM may be configured with rows and columns of a matrix, and an arbitrary number belonging to the matrix may be shown once in each row and each column.

The rows of the PSCM may correspond to the children nodes.

All first columns of the rows of the PSCM may be set to zero.

The arbitrary value of PSC1 may be selected and transmitted along with a message.

According to another aspect of the present invention, a wireless communication network apparatus is provided for preventing a replay attack. A first communication means generates a PSCM using a prime number corresponding to the number of nodes, assigns the prime number and sequence orders to nodes, selects and transmits an arbitrary value of PSC1 in the PSCM, receives PSC2 corresponding to PSC1 from the nodes, and checks PSC2. A plurality of second communication means generate PSC2 using the prime number, the sequence orders, and PSC1 received from the first communication means, and transmit the generated PSC2 to the first communication means.

PSC2 may be a value subsequent to PSC1.

PSC1 and PSC2 may be transmitted in a small-capacity field whose number of bits is equal to or less than 8 in a packet data format.

PSC1 and PSC2 may be transmitted in an 8-bit sequence number field in a general MAC frame based on an Institute of Electrical and Electronics Engineers (IEEE)802.15.4-2006 packet data standard.

PSC1 and PSC2 may be transmitted in a 3-bit reserved field in a frame control field format.

When a new method for defending against a replay attack without changing an existing MAC protocol is used in a wireless network environment, the present invention can be easily applied by supplementing a weakness for a replay attack on the basis of the IEEE 802.15-4-2006 standard and minimizing system load.

BRIEF DESCRIPTION OF THE DRAWINGS

The above and other aspects, features and advantages of the present invention will be more apparent from the following detailed description when taken in conjunction with the accompanying drawings, in which:

FIG. 2 illustrates a replay attack protection table according to an embodiment of the present invention;

FIG. 5A illustrates a MAC frame format and related fields based on an IEEE 802.15.4-2006 standard used to defend against the replay attack according to an embodiment of the present invention; and FIG. 5B illustrates a frame control field format and related fields of the MAC frame format based on the IEEE 802.15.4-2006 standard used to defend against the replay attack according to an embodiment of the present invention.

DETAILED DESCRIPTION OF THE PREFERRED EMBODIMENTS

Figure 1:
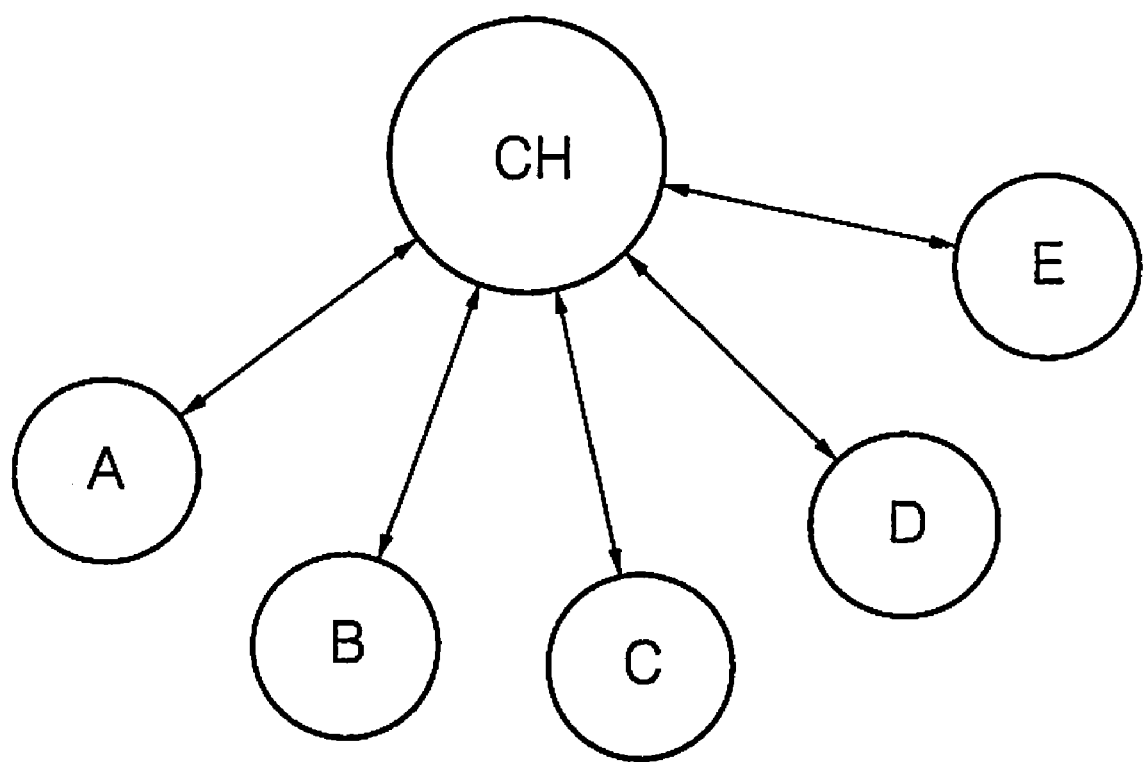
FIG. 1 illustrates a communication infrastructure.

Preferred embodiments of the present invention are described in detail with reference to the accompanying drawings. The same or similar components are designated by the same or similar reference numerals although they are illustrated in different drawings. Detailed descriptions of constructions or processes known in the art may be omitted to avoid obscuring the subject matter of the present invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. When the terms such as "first" and "second" are used to designate several components, it should not be understood that these terms limit those components but merely discriminate those components from others. In addition, the terms and words used herein should not be understood as limiting the present invention but as being illustrative of particular embodiments.

FIG. 1 illustrates a communication infrastructure.

FIG. 1 illustrates a communication infrastructure mode in which an access point or a server communicates with a plurality of nodes or clients in wireless communication. In the embodiments of the present invention, the access point or server is a main node (CH).

In general, a network mode includes a Peer-to-Peer (P2P) or ad hoc communication mode in addition to the infrastructure mode. In the P2P or ad hoc communication mode, communication is performed without a server or using only a sever having a relay function. The infrastructure mode is a point-to-multipoint communication mode, but the P2P communication mode is a one-to-one communication mode.

In a wireless network environment of the infrastructure, particularly, an IEEE 802.15.4-2006 based wireless communication environment, a frame counter scheme is used to count frames based on clocks synchronized to protect a system or message from the above-described replay attack. The same scheme is not suitable for the standard and a time stamp is supplemented and used in addition to the scheme. Since an additional header size of at least 4 bytes should be configured, system load increases. To satisfy the need for an easy and effective security method and apparatus under the communication environment of the infrastructure mode, particularly, the IEEE 802.15.4-2006 based wireless communication environment, the embodiments of the present invention are proposed.

FIG. 2 illustrates a replay attack protection table according to an embodiment of the present invention.

Before a description of the replay attack protection table of FIG. 2, it is assumed that the CH detects a number matrix configured with random numbers and corresponding nodes detect their own random numbers from the number matrix. Before or after the random numbers are transmitted in a message, the message is checked between the nodes, such that the replay attack of a malicious intruder can be identified, thereby safely implementing the message transmission.

In the embodiment of the present invention, an arbitrary value is transmitted using a code scheme called a PSCM along with a message. A corresponding node identifies the truth or falsehood of the message by checking the received arbitrary value. Various random numbers configuring the PSCM are configured in an arbitrary rule such that the malicious intruder cannot easily know the random numbers. That is, the PSCM is generated in a given rule by sequence codes that are not redundant by selecting a prime number P. Each row of the sequence codes corresponds to each node and random numbers belonging to rows are different from each other. When the sequence codes are configured in an embodiment of the present invention, a random number combination of the rows sets all first numbers of the rows to zero and is configured with different random numbers (P−1).

Specifically, when the prime number P is determined, the PSCM includes random numbers of node-specific rows that are not redundant according to the following conditions.

$PSCM = [m(I,j)]$ $m(I,j) = (I*(J-1)) \bmod P, I \geq 1, J < P$ $P > Max(PSC)-1, P \geq \text{Total Number of Nodes}+1$ All first random numbers of rows are assigned zero and the PSC indicates an arbitrary value of the PSCM.

A method for generating and configuring the replay attack protection table of FIG. 2 using the above-described conditions is described below with reference to the first and second rows.

Value of the first row and the first column, m(1,1): 0

Value of the first row and the second column, m(1,2): 1*(2-1) mod 7=1

Value of the first row and the third column, m(1,3): 1*(3-1) mod 7=2

Value of the first row and the fourth column, m(1,4): 1*(4-1) mod 7=3

Value of the first row and the fifth column, m(1,5): 1*(5-1) mod 7=4

Value of the first row and the sixth column, m(1,6): 1*(6-1) mod 7=5

Value of the first row and the seventh column, m(1,7): 1*(7-1) mod 7=6

Value of the second row and the first column, m(2, 1): 0

Value of the second row and the second column, m(2,2): 2*(2-1) mod 7=2

Value of the second row and the third column, m(2,3): 2*(3-1) mod 7=4

Value of the second row and the fourth column, m(2,4): 2*(4-1) mod 7=6

Value of the second row and the fifth column, m(2,5): 2*(5-1) mod 7=1

Value of the second row and the sixth column, m(2,6): 2*(6-1) mod 7=3

Value of the second row and the seventh column, m(2,7): 2*(7-1) mod 7=5

Since each row value is shown in only one row according to the above-described conditions, this characteristic is used to make it possible to efficiently manage security. A replay attack of a malicious intruder of the third party can be efficiently defended when values are transmitted and checked through the PSCM arranged in a uniform rule along with a message between the CH and the nodes.

Figure 3:
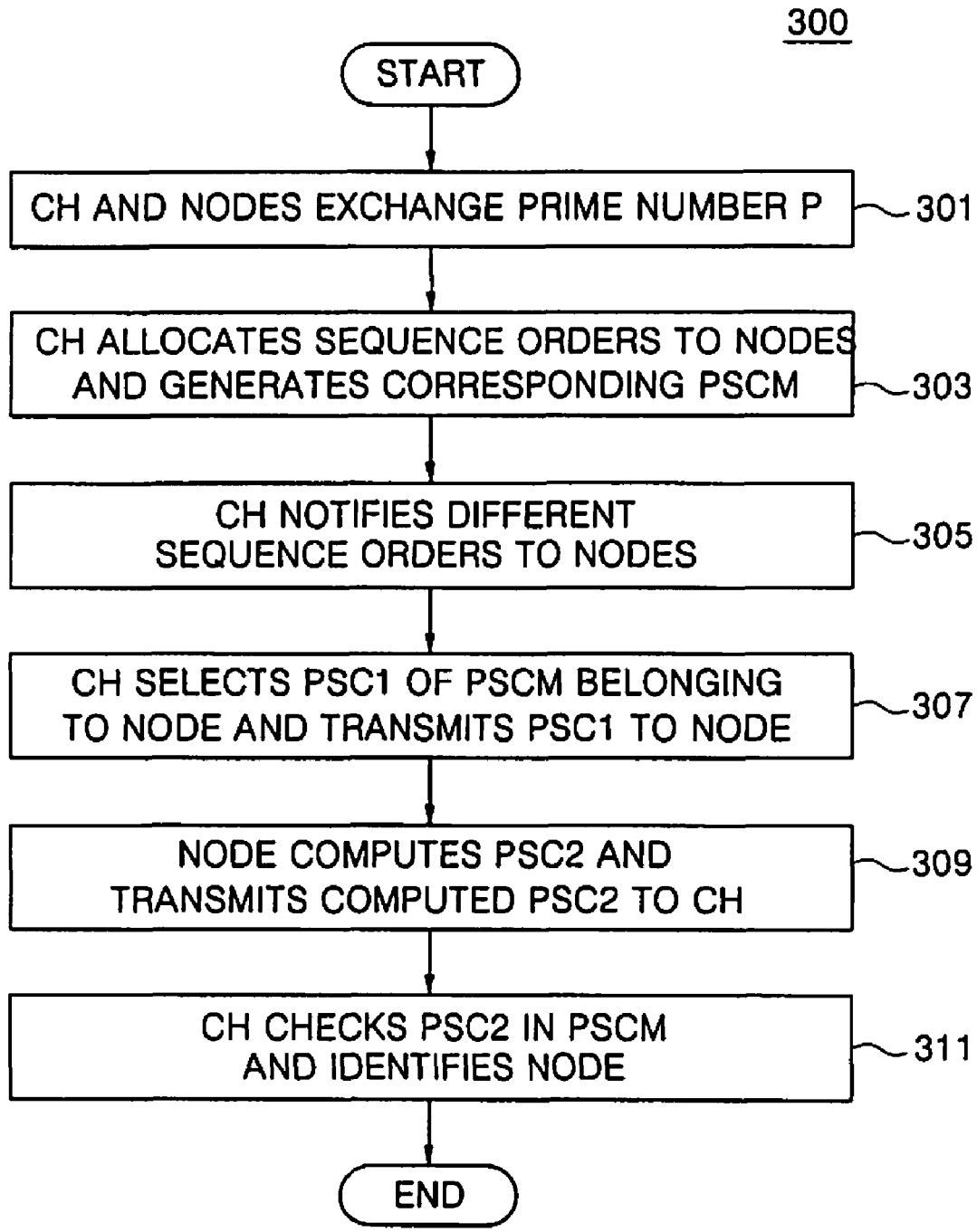
FIG. 3 is a flowchart illustrating a method for defending against a replay attack according to an embodiment of the present invention.

FIG. 3 is a flowchart illustrating a method for defending against a replay attack according to an embodiment of the present invention.

In the replay attack protection method 300 of the present invention, a prime number P is exchanged between the CH and a node in step 301. The P value is exchanged between the CH and the node since the prime number P is an essential element required to create the PSCM described with reference to FIG. 2. In general, the P value is exchanged in a joining process between the CH and the node. The node may also include a plurality of nodes. In an embodiment of the present invention, a description for the plurality of nodes is provided.

When the arbitrary prime number P is mutually exchanged, the CH allocates different sequence orders to the nodes and generates a PSCM corresponding to the sequence orders in step 303. A PSCM generation method has been described above with reference to FIG. 2.

The CH notifies the sequence orders allocated in the previous step to the nodes in step 305. Steps 301-305 can be understood as the joining process. A process subsequent to step 305 can be understood as a communication process.

The nodes completely prepare to communicate with the CH and the CH selects an arbitrary value PSC1 of the PSCM belonging to a corresponding node and transmits the selected PSC1 to the corresponding node in step 307. At this time, PSC1 can be transmitted along with a message to be transmitted. After a check procedure is completed, the message can be transmitted.

The corresponding node receiving PSC1 can compute PSC2 subsequent to PSC1 using a previously received sequence order, PSC1, and the mechanism described with reference to FIG. 2. Since the mechanism is implemented with an algorithm and shared between the CH and the nodes, it can be computed easily. Accordingly, the corresponding node transmits the computed PSC2 to the CH in step 309.

The CH can easily identify the corresponding node by checking PSC2 transmitted from the corresponding node using its own managed PSCM in step 311.

Figure 4:
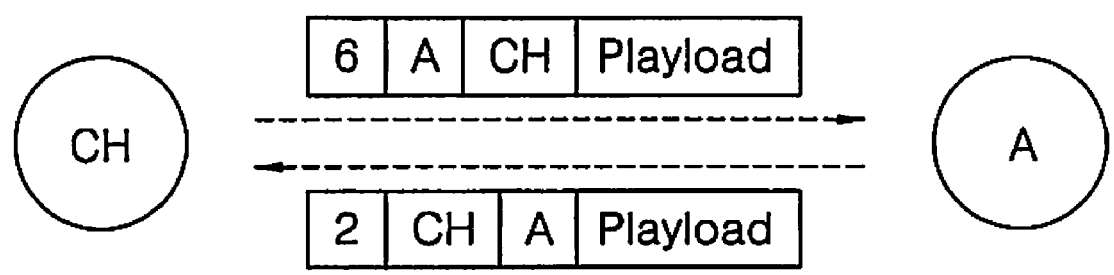
FIG. 4 illustrates a schematic structure of packet data in which PSC1 and PSC2 are transmitted using 3 bits.

A format according to an embodiment of the present invention is illustrated in FIG. 4 in relation to a configuration of packet data including the message in steps 307 and 309.

FIG. 4 illustrates a schematic structure of packet data in which a PSC is transmitted.

Referring to FIG. 4, only 3 bits are used to simply identify a replay attack for convenience of a description. In general, packet data includes header information and a payload. For example, the header information is configured with multiple bytes in the IEEE 802.15.4-2006 standard as illustrated in FIG. 5. Referring to FIG. 4, when the CH transmits the packet data to a corresponding node, PSC1 is first placed and the others indicate the CH and the node. When the corresponding node transmits the packet data to the CH, PSC2 is first placed and the others indicate the CH and the node. When PSC1 and PSC2 are used, a small-capacity message can be mutually efficiently checked.

FIG. 5A illustrates a MAC frame format and related fields of the IEEE 802.15.4-2006 standard used to defend against the replay attack according to an embodiment of the present invention.

FIG. 5B illustrates a frame control field format and related fields of the MAC frame format based on the IEEE 802.15.4-2006 standard used to defend against the replay attack according to an embodiment of the present invention.

Referring to FIGS. 5A and 5B, an embodiment of the present invention is provided to transmit PSC1 and PSC2, for example, using an 8-bit sequence number field of the MAC frame format indicating header information in the IEEE 802.15.4-2006 standard based packet data format or a 3-bit reserved field of the frame control fields. However, this is not a limiting embodiment of the present invention. Rather, a field configured with a small number of spare bits can be used.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for preventing a replay attack, comprising the steps of:

mutually exchanging a prime number between a main node and one or more children nodes;

generating, by the main node, a Prime Sequence Code Matrix (PSCM) corresponding to the prime number;

notifying, by the main node, the one or more children nodes of sequence orders corresponding to the one or more children nodes;

selecting, by the main node, an arbitrary value of a Prime Sequence Code-1 (PSC1) among a series of values corresponding to an arbitrary node in the PSCM;

computing, by the arbitrary node, a Prime Sequence Code-2 (PSC2) subsequent to receiving the PSC1 using a sequence order received from the main node and the prime number, and transmitting PSC2 to the main node; and comparing, by the main node, the received PSC2 with the PSCM.

2. The method according to claim 1, further comprising:

mutually exchanging, by the main node and the one or more children nodes, an algorithm for automatically computing the PSC1 and the PSC2 before the PSCM is generated.

3. The method according to claim 1, wherein the prime number is mutually exchanged in a process in which the one or more children nodes join the main node.

4. The method according to claim 1, wherein the PSCM is configured with rows and columns of a matrix, and an arbitrary number belonging to the matrix is shown once in each row and each column.

5. The method according to claim 4, wherein the rows of the PSCM correspond to the one or more children nodes.

6. The method according to claim 4, wherein all first columns of the rows of the PSCM are set to zero.

7. The method according to claim 1, wherein the arbitrary value of PSC1 is selected and transmitted along with a message.

8. A wireless communication network apparatus for preventing a replay attack, comprising:

a first communication means generating a Prime Sequence Code Matrix (PSCM) using a prime number corresponding to a number of nodes, assigning the prime number and sequence orders to the nodes, selecting and transmitting an arbitrary value of a Prime Sequence Code-1 (PSC1) in the PSCM, receiving a Prime Sequence Code-2 (PSC2) corresponding to the PSC1 from the nodes, and checking PSC2; and a plurality of second communication means generating the PSC2 using the prime number, the sequence orders, and the PSC1 received from the first communication means, and transmitting the generated PSC2 to the first communication means.

9. The wireless communication network apparatus according to claim 8, wherein the PSC2 is a value subsequent to the PSC1.

10. The wireless communication network apparatus according to claim 8, wherein the PSC1 and the PSC2 are transmitted in a small-capacity field whose number of bits is equal to or less than 8 in a packet data format.

11. The wireless communication network apparatus according to claim 8, wherein the PSC1 and the PSC2 are transmitted in an 8-bit sequence number field in a general Media Access Control (MAC) frame based on an Institute of Electrical and Electronics Engineers (IEEE) 802.15.4-2006 packet data standard.

12. The wireless communication network apparatus according to claim 11, wherein the PSC1 and the PSC2 are transmitted in a 3-bit reserved field in a frame control field format.

* * * * *